(12) United States Patent
Musuraca (10) Patent No.: US 8,763,224 B2
(45) Date of Patent: Jul. 1, 2014

(54) PINION DISASSEMBLY TOOL AND METHOD

(76) Inventor: John V. Musuraca, Mason, OH (US)

( * ) Notice: Subject to any disclaimer, the term of this patent is extended or adjusted under 35 U.S.C. 154(b) by 371 days.

(21) Appl. No.: 13/234,741

(22) Filed: Sep. 16, 2011

(65) Prior Publication Data

US 2013/0067745 A1    Mar. 21, 2013

(51) Int. Cl.
*B23P 19/04*    (2006.01)
*F16H 57/023*    (2012.01)

(52) U.S. Cl.
CPC .................................. *F16H 57/023* (2013.01)
USPC .......................................................... 29/259

(58) Field of Classification Search
CPC ...... B25B 27/02; B25B 27/023; B25B 27/04; B25B 27/06; B25B 27/00375; B25B 27/062; B25B 27/0035
USPC ........... 29/259, 264, 266, 260, 263, 265, 239, 29/426.1, 426.5, 256
See application file for complete search history.

(56) References Cited

U.S. PATENT DOCUMENTS

| | | |
|---|---|---|
| 1,227,457 A | 5/1917 | Langan |
| 1,268,285 A | 6/1918 | Schilling |
| 1,310,447 A | 7/1919 | Schilling |
| 1,347,809 A | 7/1920 | Frisz et al. |
| 1,383,382 A | 7/1921 | Brockway |
| 1,394,129 A | 10/1921 | Wickersham |
| 1,494,832 A | 5/1924 | Grant |
| 1,597,909 A | 8/1926 | Livesay |
| 1,599,340 A | 9/1926 | Malone |
| 2,684,527 A | 7/1954 | Hedlund |
| 2,736,954 A | 3/1956 | Palmer |
| 4,299,020 A | 11/1981 | Grego, Jr. |
| 4,463,489 A | 8/1984 | James |
| 4,771,528 A | 9/1988 | Stromberg |
| 4,868,965 A | 9/1989 | Drymon |
| 4,929,111 A | 5/1990 | Lauritano |
| 4,989,312 A | 2/1991 | Maddalena |
| 5,233,741 A | 8/1993 | Maynard |
| 5,257,445 A | 11/1993 | Mayberry |
| 5,692,282 A | 12/1997 | Baca |
| 5,894,650 A | 4/1999 | Barenburg |
| 7,328,501 B2 | 2/2008 | Smiley et al. |

*Primary Examiner* — John C Hong
(74) *Attorney, Agent, or Firm* — Wood, Herron & Evans, LLP (57) ABSTRACT

A pinion disassembly tool is configured to remove a yoke or a flange member and a pinion fastener from a splined pinion shaft in a pinion assembly. The tool includes a yoke holding plate with a central aperture sized to receive a socket wrench during removal of the pinion fastener. The yoke holding plate includes fastener apertures for connection to the yoke and at least one non-circular aperture for receiving a breaker bar during removal of the pinion fastener. The tool also includes a drive plate with a threaded aperture, the drive plate inserted through the central aperture of the yoke holding plate after removal of the pinion fastener. The tool also includes a drive bolt engaged with the threaded aperture and configured to force the drive plate and the yoke holding plate to pull the yoke from the splined pinion shaft as the drive bolt is rotated.

8 Claims, 7 Drawing Sheets

PINION DISASSEMBLY TOOL AND METHOD

TECHNICAL FIELD

The present invention generally relates to an apparatus and a method for disassembling a pinion assembly used with final drive units of motorized vehicles.

BACKGROUND

Motorized vehicles generally include a drive transmission with many multi-part assemblies for delivering driving power from an engine to two or more wheels. For example, a drive transmission for the rear wheels of a motorized vehicle may include a final drive unit including a differential at a rear axle and a pinion assembly connecting the differential to a primary drive shaft. The pinion assembly may be coupled to the drive shaft with a universal joint or U-joint that enables the drive shaft to pivot with respect to the pinion assembly during operation of the motorized vehicle. As well understood in the automotive field, these universal joints are typically formed between two yokes located on the pinion assembly and the drive shaft. Thus, the pinion assembly includes a splined pinion shaft configured to receive a yoke. The yoke is slid onto the pinion shaft and locked in position by a pinion fastener or pinion nut coupled to a threaded free end of the pinion shaft. Alternatively, the pinion assembly may be coupled to the drive shaft with a flange member that includes internal splines for engaging the splined pinion shaft.

In some circumstances the pinion assembly must be disassembled to repair or replace the components of the pinion assembly or the other elements of the drive transmission (such as the differential). Conventionally, this disassembly of the pinion assembly requires two distinct tools for various steps in the disassembly process. First, a plate-shaped yoke holding fixture must be bolted onto the yoke or flange member so that a breaker bar may hold the yoke or flange member in position during removal of the pinion fastener with a standard socket wrench. Second, a yoke removal tool is coupled to the yoke or flange member, the yoke removal tool including a cross-bar with a central threaded aperture and a bolt engaged with the aperture. As the bolt is rotated to advance through the aperture in the plate, the cross-bar pulls the yoke or flange member outwardly and off the splines of the pinion shaft. Consequently, two separate tools are required every time the yoke or flange member is to be removed from the pinion shaft, and the pinion disassembly process is slow and inefficient.

Thus, it is an object of the invention to provide an improved pinion disassembly tool and method.

SUMMARY

According to one aspect of the invention, a pinion disassembly tool is configured to remove a yoke or flange member from a splined pinion shaft in a pinion assembly. The pinion disassembly tool includes a yoke holding plate including a central aperture sized to receive a socket wrench during removal of a pinion fastener from the pinion shaft. The yoke holding plate also includes a plurality of fastener apertures positioned around the central aperture and configured to receive fasteners coupled to the yoke or flange member. The yoke holding plate further includes at least one non-circular aperture configured to receive a breaker bar during removal of the pinion fastener.

The pinion disassembly tool also includes a drive plate configured to be inserted through the central aperture of the yoke holding plate after removal of the pinion fastener. The drive plate includes a threaded aperture. The pinion disassembly tool includes a drive bolt engaged with the threaded aperture of the drive plate. The drive bolt operates to force the drive plate and the yoke holding plate to pull the yoke or flange member from the splined pinion shaft as the drive bolt is rotated into engagement with the pinion shaft. Thus, a single pinion disassembly tool can completely disassemble a pinion assembly.

In some embodiments, the central aperture of the yoke holding plate may include an inner periphery with at least one recess, and the drive plate may include an outer periphery with at least one projection corresponding in shape to the at least one recess. More particularly, the central aperture includes two opposed recesses and the drive plate includes two opposed tangs. The tangs are configured to be rotated into alignment with the opposed recesses so that the drive plate may be inserted through the central aperture of the yoke holding plate. The tangs may then be rotated out of alignment with the recesses so that the drive plate frictionally engages the yoke holding plate when the drive bolt is rotated to pull the yoke or flange member from the splined pinion shaft.

In another aspect of the invention, a method of disassembling a pinion assembly having a splined pinion shaft, a yoke or flange member, and a pinion fastener includes coupling a yoke holding plate of a pinion disassembly tool to the yoke or flange member using fasteners. The method also includes holding the yoke holding plate and the yoke or flange member in position while removing the pinion fastener from the pinion shaft. A drive plate with a threaded aperture is inserted through a central aperture of the yoke holding plate with a drive bolt engaged with the threaded aperture. The method also includes rotating the drive bolt against the pinion shaft to force the drive plate to pull the yoke holding plate and the yoke or flange member from the splined pinion shaft.

In some embodiments, the method includes aligning at least one projection on the drive plate with at least one recess on the yoke holding plate prior to insertion of the drive plate through the central aperture of the yoke holding plate. The drive plate may then be rotated after insertion through the central aperture so that the at least one projection of the drive plate frictionally engages the yoke holding plate. This frictional engagement discourages relative rotation of the drive plate and the yoke holding plate.

DETAILED DESCRIPTION

For the purpose of the present discussion, the method and apparatus of this invention is described in connection with removing a pinion assembly of a drive transmission in a motorized vehicle. It should be understood that the methods and apparatus of this invention are believed to be equally applicable for use in connection with the removal of other types of yokes, flange members, or other structural members from splined shafts used for different purposes. As a result, the following description and the drawings illustrate exemplary embodiments of the invention in accordance with the non-limiting motorized vehicle context.

Figure 1:
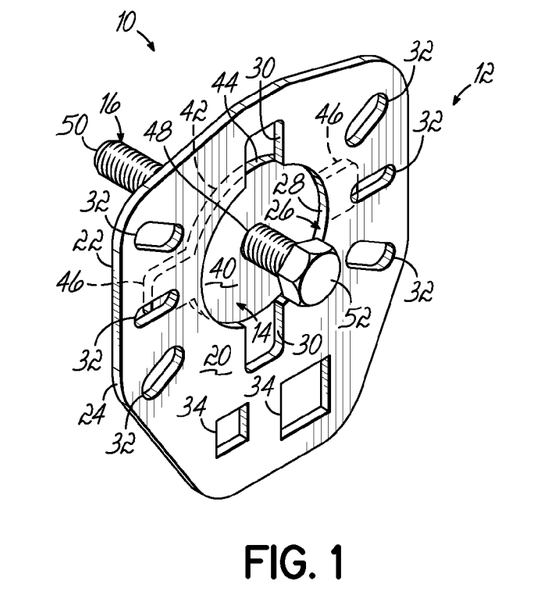
FIG. 1 is a perspective view of one embodiment of a pinion disassembly tool according to the invention.
Figure 2:
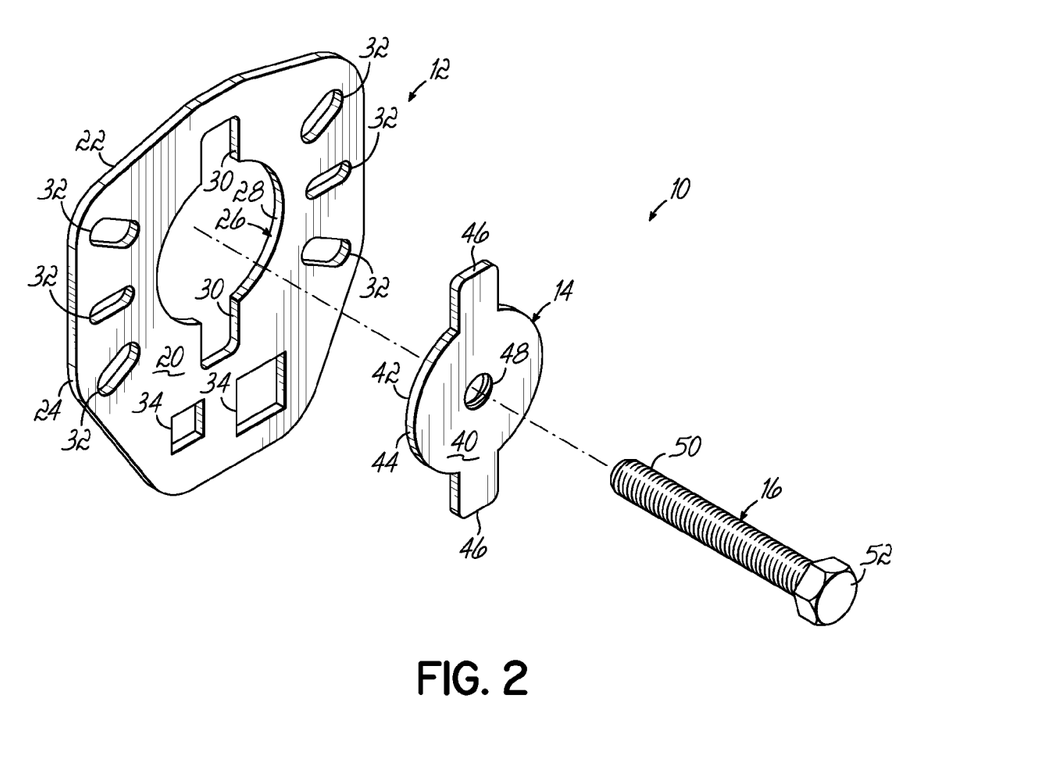
FIG. 2 is an exploded perspective view of the pinion disassembly tool of FIG. 1.

With reference to FIGS. 1 and 2, one embodiment of a pinion disassembly tool 10 includes a yoke holding plate 12, a drive plate 14, and a drive bolt 16. The yoke holding plate 12 is configured to hold a yoke or flange member of a pinion assembly in position during removal of a pinion fastener from a splined pinion shaft, as described in further detail below. The drive plate 14 is configured to interact with the yoke holding plate 12 to pull the yoke or flange member from the splined pinion shaft after the pinion fastener has been removed. This pulling force is produced by engagement of the drive bolt 16 with the drive plate 14 and the yoke or flange member. As a result, a single pinion disassembly tool 10 is operable to fully disassemble the various components (yoke or flange member, pinion fastener, pinion shaft) of a pinion assembly in a motorized vehicle or other apparatus.

As shown in FIGS. 1 and 2, the yoke holding plate 12 is a plate-shaped member including a front surface 20, a rear surface 22, and an outer edge 24 extending between the front and rear surfaces 20, 22. The outer edge 24 defines a roughly rectangular shape with rounded and/or chamfered corners, although the yoke holding plate 12 may be reshaped in other embodiments of the pinion disassembly tool 10. The yoke holding plate 12 includes a central aperture 26 sized to receive a socket wrench or the drive plate 14. The central aperture 26 is defined by an inner periphery 28 having a generally circular shape except at two opposed recesses 30 projecting radially outwardly from the circular shape. The opposed recesses 30 define generally rectangular cross-sections. It will be understood that more or fewer recesses 30 of various shapes may also be provided in the inner periphery 28. The recesses 30 may also be reshaped in other embodiments.

The yoke holding plate 12 also includes a plurality of fastener apertures 32 located between the outer edge 24 and the central aperture 26. The fastener apertures 32 are positioned to overlie corresponding yoke apertures in a yoke as described in further detail below. In this regard, the fastener apertures 32 provide access through the yoke holding plate 12 for fasteners to couple the yoke holding plate 12 to the yoke or flange member. The fastener apertures 32 shown in FIGS. 1 and 2 are shaped as slot-shaped apertures to enable different sizes and shapes of yokes or flange members to be connected to the yoke holding plate 12. It will be appreciated that the number, size, and shape of the plurality of fastener apertures 32 may be modified in other embodiments of the pinion disassembly tool 10.

The yoke holding plate 12 further includes at least one non-circular aperture 34 configured to receive a breaker bar (not shown in FIGS. 1 and 2) during removal of a pinion fastener from a pinion shaft. In the illustrated embodiment, the yoke holding plate 12 includes two non-circular apertures 34 having different cross-sectional sizes for differently sized breaker bars. Moreover, the non-circular apertures 34 are shown with a square or rectangular cross section in FIGS. 1 and 2, although it will be understood that the shape and size of these apertures 34 may be modified for other embodiments. The non-circular aperture 34 engages the breaker bar to prevent rotation of the yoke holding plate 12.

The drive plate 14 includes a front surface 40, a rear surface 42, and an outer periphery 44 extending between the front and rear surfaces 40, 42. The outer periphery 44 is sized and shaped to correspond to the inner periphery 28 of the central aperture 26 in the yoke holding plate 12. To this end, the outer periphery 44 defines a substantially circular cross-section for the drive plate 14 except for two opposed projections or tangs 46 extending radially outwardly from the substantially circular portion of the outer periphery 44. Similar to the opposed recesses 30 in the central aperture 26 of the yoke holding plate 12, the opposed tangs 46 are shaped with a generally rectangular cross-section. Consequently, the drive plate 14 may be inserted through the central aperture 26 in the yoke holding plate 12 by aligning the opposed tangs 46 with the opposed recesses 30 as shown in FIG. 2. It will be understood that the number, shape, and/or size of the opposed tangs 46 may be modified for different embodiments of the pinion disassembly tool 10.

The drive plate 14 also includes a threaded aperture 48 configured to receive the drive bolt 16. The drive bolt 16 includes a threaded shank 50 configured to engage the threaded aperture 48 and a head 52 configured to be rotated by a conventional socket wrench or other tool. When the drive plate 14 is positioned adjacent the rear surface 22 of the yoke holding plate 12 with the opposed tangs 46 out of alignment with the opposed recesses 30 (as shown in FIG. 1), rotation of the drive bolt 16 may cause the drive plate 14 to pull the yoke holding plate 12 towards the head 52 of the drive bolt 16. This pulling action is described in further detail below, but results from the frictional engagement of the front surface 40 of the drive plate 14 at the tangs 46 with the rear surface 22 of the yoke holding plate 12. In this regard, the drive plate 14 and the drive bolt 16 act as a pulling mechanism when combined with the yoke holding plate 12.

Figure 3:
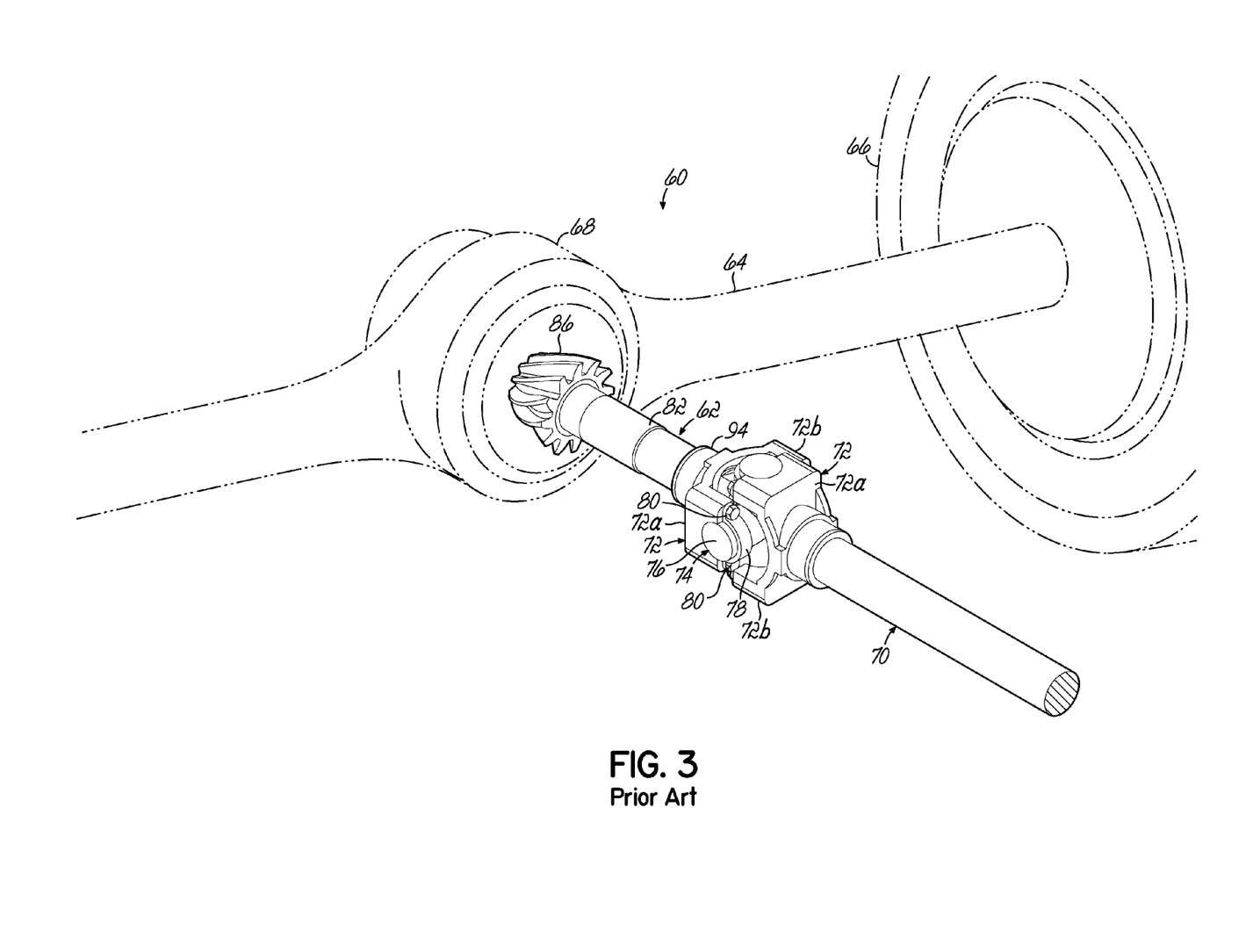
FIG. 3 is a perspective view of a drive transmission of a motorized vehicle including an exemplary pinion assembly including a yoke.

With reference to FIGS. 3-7, one embodiment of a rear drive transmission 60 of a motorized vehicle and a method of disassembling a pinion assembly 62 are shown. As shown in FIG. 3, the rear drive transmission 60 includes a rear axle 64 connecting the rear wheels 66 to a differential 68. A primary drive shaft 70 from the motor is connected to the differential 68 by the pinion assembly 62. The pinion assembly 62 and the primary drive shaft 70 each include a yoke 72 joined together at a universal joint 74 or "U-joint". The universal joint 74 enables three-dimensional bending of the pinion assembly 62 with respect to the primary drive shaft 70 as the drive shaft 70 rotates the pinion assembly 62. To this end, the universal joint 74 includes at least one crossbar 76 coupled to the arms 72a, 72b of the yoke 72 on the pinion assembly 62 by straps 78 and threaded fasteners 80 extending through the straps 78 and into the arms 72a, 72b of the yoke 72. It will be understood that alternative joints with the primary drive shaft 70 may be formed, such as those using flange members instead of yokes, without departing from the scope of this invention (see FIG. 8, below).

Figure 4:
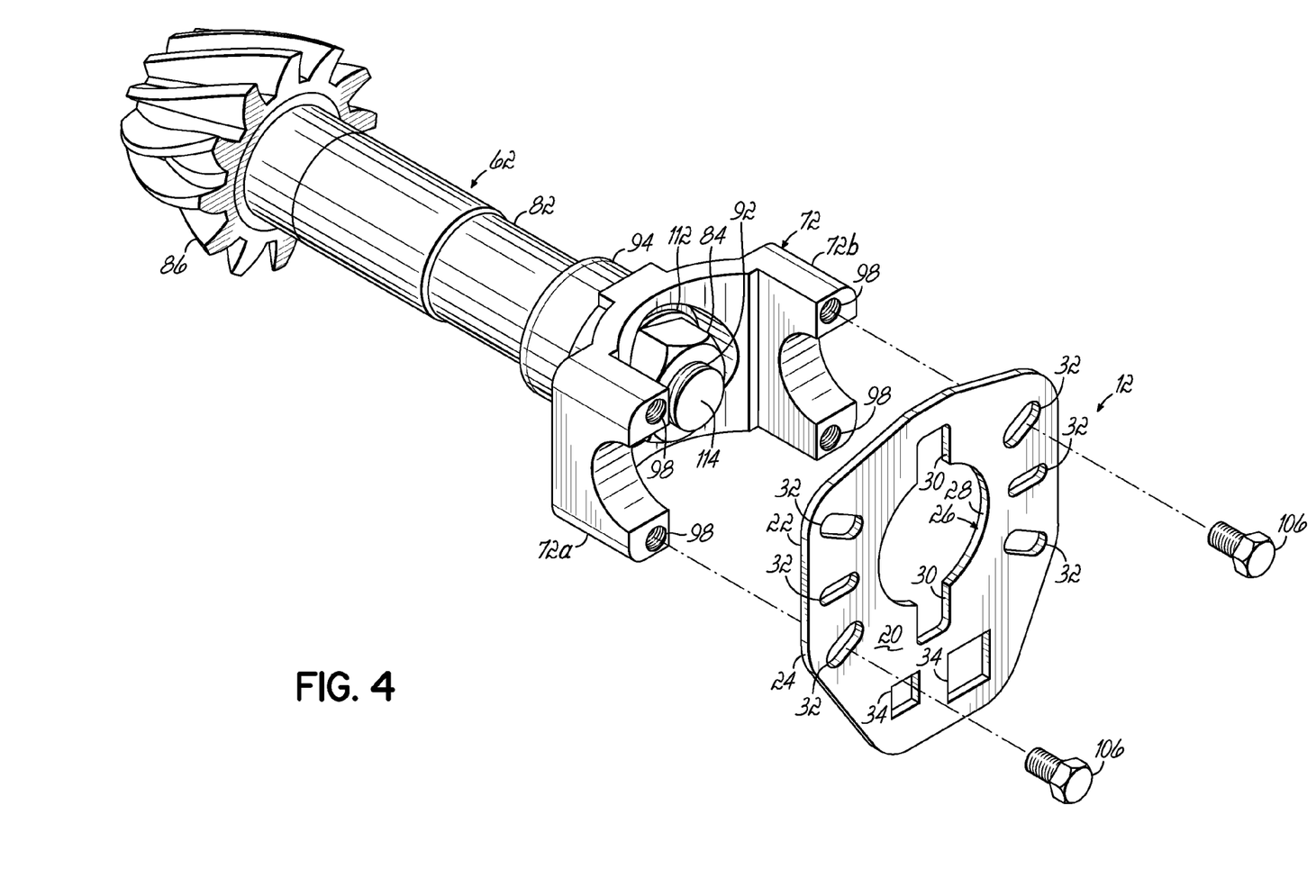
FIG. 4 is a partially exploded view of the pinion disassembly tool of FIG. 1 during placement of the tool onto the pinion assembly of FIG. 3.

Thus, with reference to FIG. 4, the pinion assembly 62 includes the yoke 72, a pinion shaft 82, and a pinion fastener 84. The pinion shaft 82 includes a spiral bevel gear 86 at one end which is configured to be coupled to a corresponding gear of the differential 68. The pinion shaft 82 also includes a splined end 88 opposite the spiral bevel gear 86. The splined end 88 includes a plurality of radial splines 90 and a threaded rod 92 extending longitudinally beyond the radial splines 90. The yoke 72 is generally Y-shaped and includes a central portion 94 extending in an opposite direction from the arms 72a, 72b. The central portion 94 also includes an aperture 96 configured to receive the splined end 88 of the pinion shaft 82. The arms 72a, 72b of the yoke 72 also include threaded apertures 98 configured to receive threaded fasteners for the universal joint 74 or the yoke holding plate 12 as described above. To assemble the pinion assembly 62, the aperture 96 of the yoke 72 is slid onto the splined end 88 of the pinion shaft 82, and then the pinion fastener 84 (which may be a conventional threaded nut) is threadably engaged with the threaded rod 92 to lock the yoke 72 in position on the pinion shaft 82. The completely assembled pinion assembly 62 is shown in FIG. 4 prior to operation of the pinion disassembly tool 10.

Figure 5:
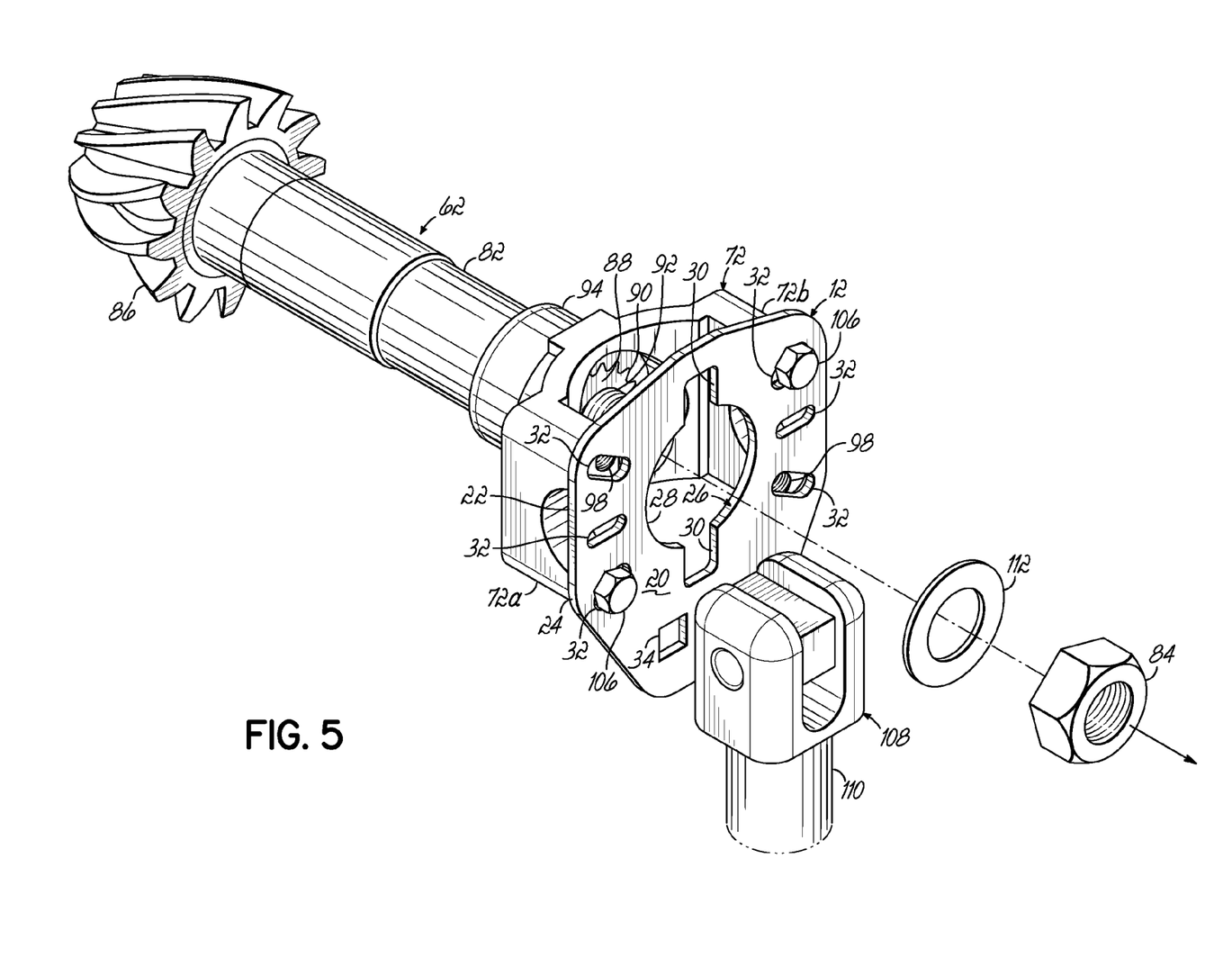
FIG. 5 is a perspective view of the pinion disassembly tool and the pinion assembly of FIG. 4 during a first disassembly step.

To disassemble the pinion assembly 62, a first step is coupling the yoke holding plate 12 to the yoke 72. As shown in FIG. 4, at least two of the slot-shaped fastener apertures 32 are aligned with threaded apertures 98 located in the arms 72a, 72b of the yoke 72. Then at least two threaded fasteners 106 such as bolts are inserted through the fastener apertures 32 and engaged with the threaded apertures 98 to lock the yoke holding plate 12 in position on the yoke 72 as shown in FIG. 5.

Next, a breaker bar 108 is inserted into engagement with one of the non-circular apertures 34 in the yoke holding plate 12. The breaker bar 108 includes a handle portion 110 that may be held by a user to prevent the yoke holding plate 12 and the yoke 72 from rotating with the pinion shaft 82. A conventional socket wrench (not shown) such as a ½ inch or ¾ inch socket wrench is then inserted through the central aperture 26 and used to rotate the pinion fastener 84, thereby removing the pinion fastener 84 from the threaded rod 92 on the splined end 88 of the pinion shaft 82. It will be understood that a washer 112 located between the pinion fastener 84 and the pinion shaft 82 may also be removed at this time. At this point, the yoke 72 is able to be pulled off the splined end 88 of the pinion shaft 82.

Figure 6:
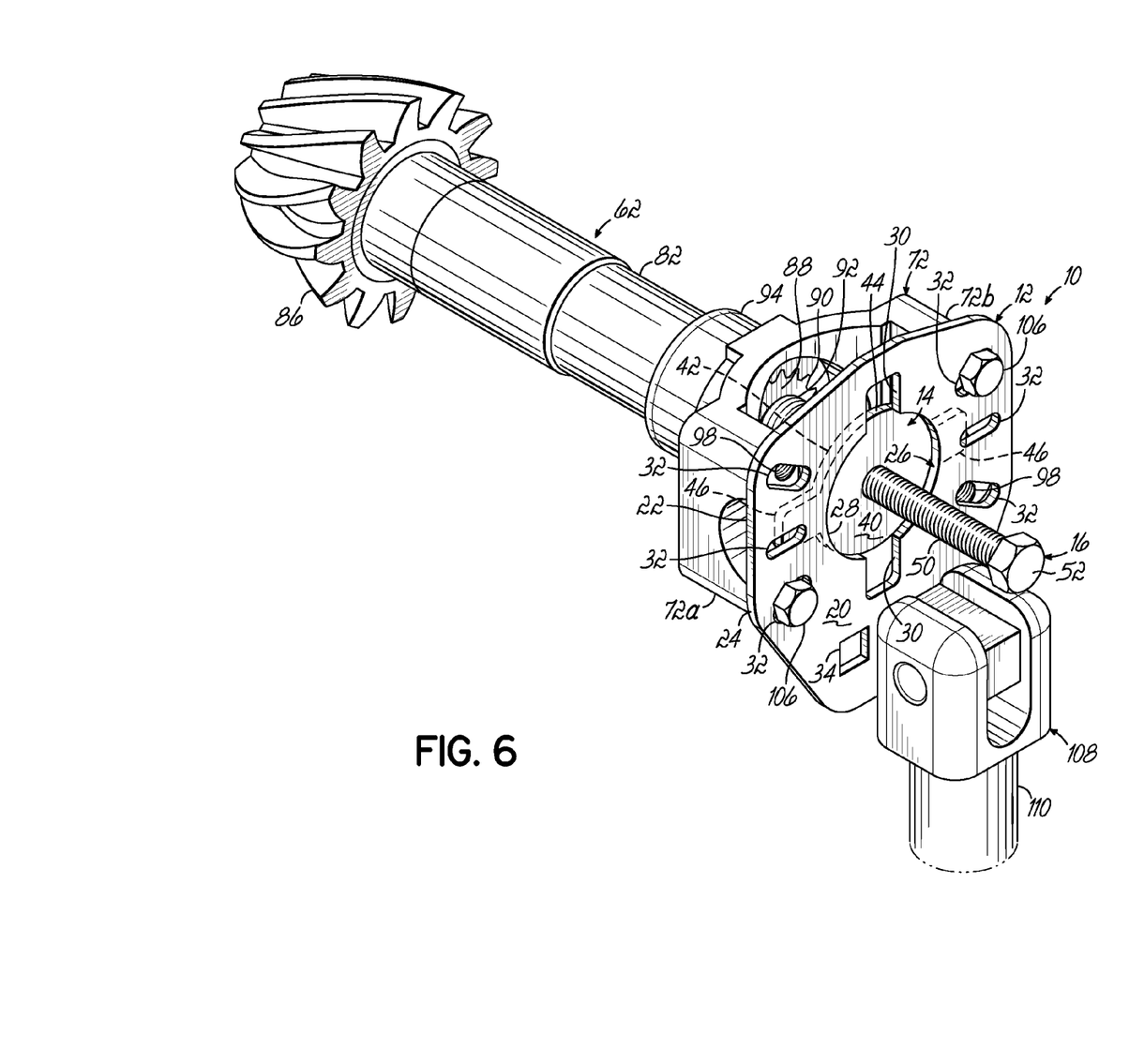
FIG. 6 is a perspective view of the pinion disassembly tool and the pinion assembly of FIG. 4 prior to a second disassembly step.

With reference to FIG. 6, the drive plate 14 is then positioned so that the opposed tangs 46 align with the opposed recesses 30 in the central aperture 26 of the yoke holding plate 12. The drive plate 14 is inserted through the central aperture 26 with the drive bolt 16 engaged with the threaded aperture 48. The drive plate 14 may then be rotated to the position shown in FIG. 6 with the opposed tangs 46 unaligned with the opposed recesses 30. To this end, the front surface 40 of the drive plate 14 is frictionally engaged with the rear surface 22 of the yoke holding plate 12. More particularly, the opposed tangs 46 are in frictional engagement with the rear surface 22 of the yoke holding plate 12. The drive bolt 16 is then rotated into engagement with a free end 114 of the threaded rod 92 on the splined end 88 of the pinion shaft 82.

Figure 7:
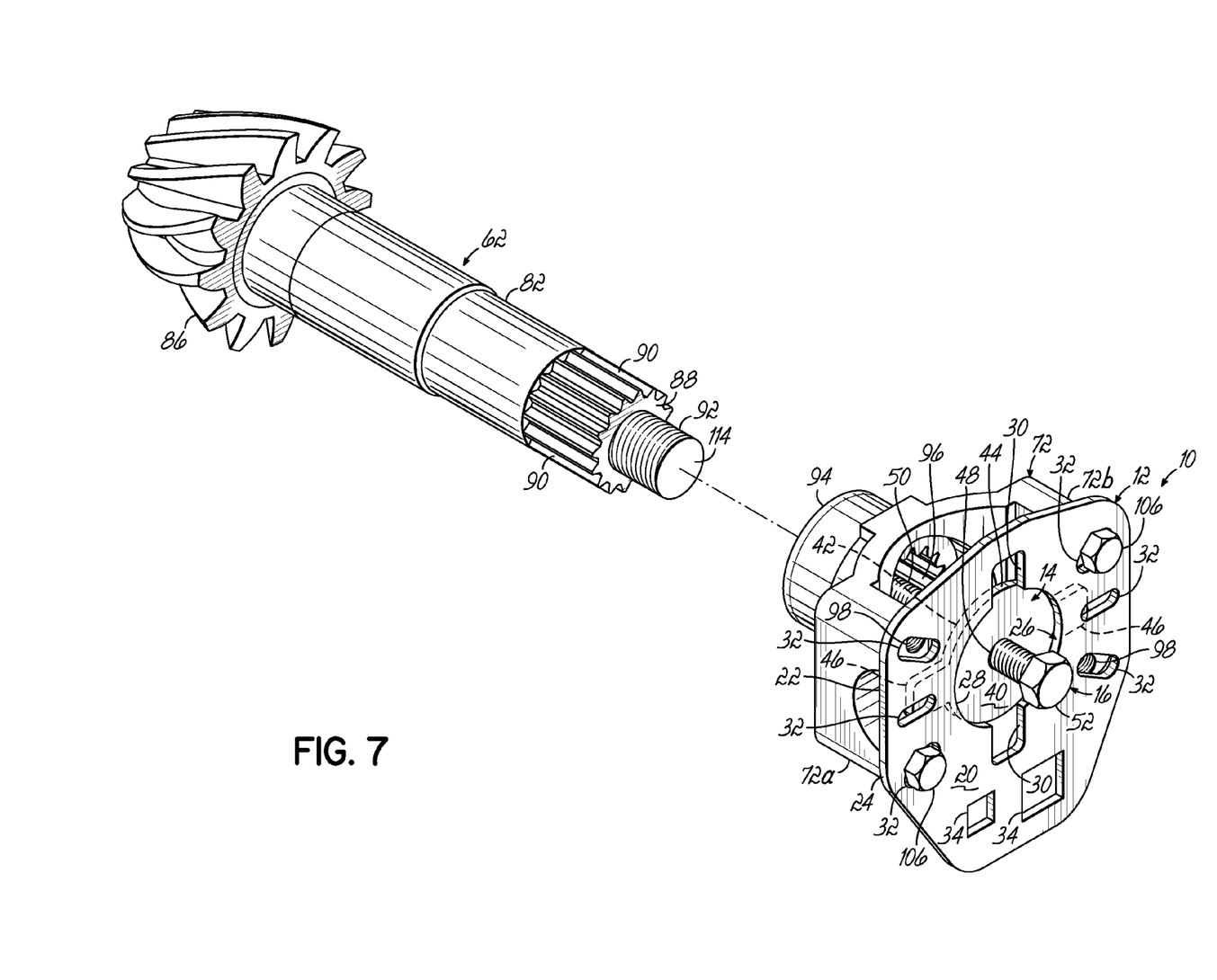
FIG. 7 is a perspective view of the pinion disassembly tool and the pinion assembly of FIG. 6 after the second disassembly step.

Once the drive bolt 16 engages the free end 114 of the threaded rod 92, further rotation of the drive bolt 16 against the pinion shaft 82 will apply a force tending to rotate the drive plate 14. However, this rotation of the drive plate 14 is discouraged by the frictional engagement of the drive plate 14 and the yoke holding plate 12, the yoke holding plate 12 still being held against rotation by the breaker bar 108. Thus, the drive bolt 16 advances through the drive plate 14 at the threaded aperture 48. But since the drive bolt 16 cannot actually advance into the pinion shaft 82, the rotation of the drive bolt 16 instead drives the drive plate 14 away from the pinion shaft 82 and towards the head 52 of the drive bolt 16. As a result, rotation of the drive bolt 16 causes the drive plate 14 to pull the yoke holding plate 12 and also the yoke 72 away from the splined end 88 of the pinion shaft 82, thereby disengaging the aperture 96 in the yoke 72 from the splines 90 in the pinion shaft 82. The final disengagement of the yoke 72 from the pinion shaft 82 is shown in FIG. 7. The pinion disassembly tool 10 may then be removed from the yoke 72 by removing the threaded fasteners 106 from the arms 72a, 72b of the yoke 72.

Consequently, the pinion disassembly tool 10 enables both the removal of a pinion fastener 84 from a pinion shaft 82 and the subsequent removal of a yoke 72 from the splined end 88 of the pinion shaft 82. The pinion disassembly tool 10 thus is a dual-function device that saves time and tool use when disassembling a pinion assembly 62.

It will be understood that the various components of the pinion disassembly tool 10 may be formed from stainless steel or another structurally rigid material (whether metallic or plastic). Moreover, the various components of the pinion disassembly tool 10 may be formed of various sizes appropriate for the disassembly operation to be performed. In one example, the yoke holding plate 12 may define a length of 5.16 inches along a direction parallel to the opposed recesses 30 while the drive plate 14 may define a maximum length of 3.2 inches at the opposed tangs 46.

Figure 8:
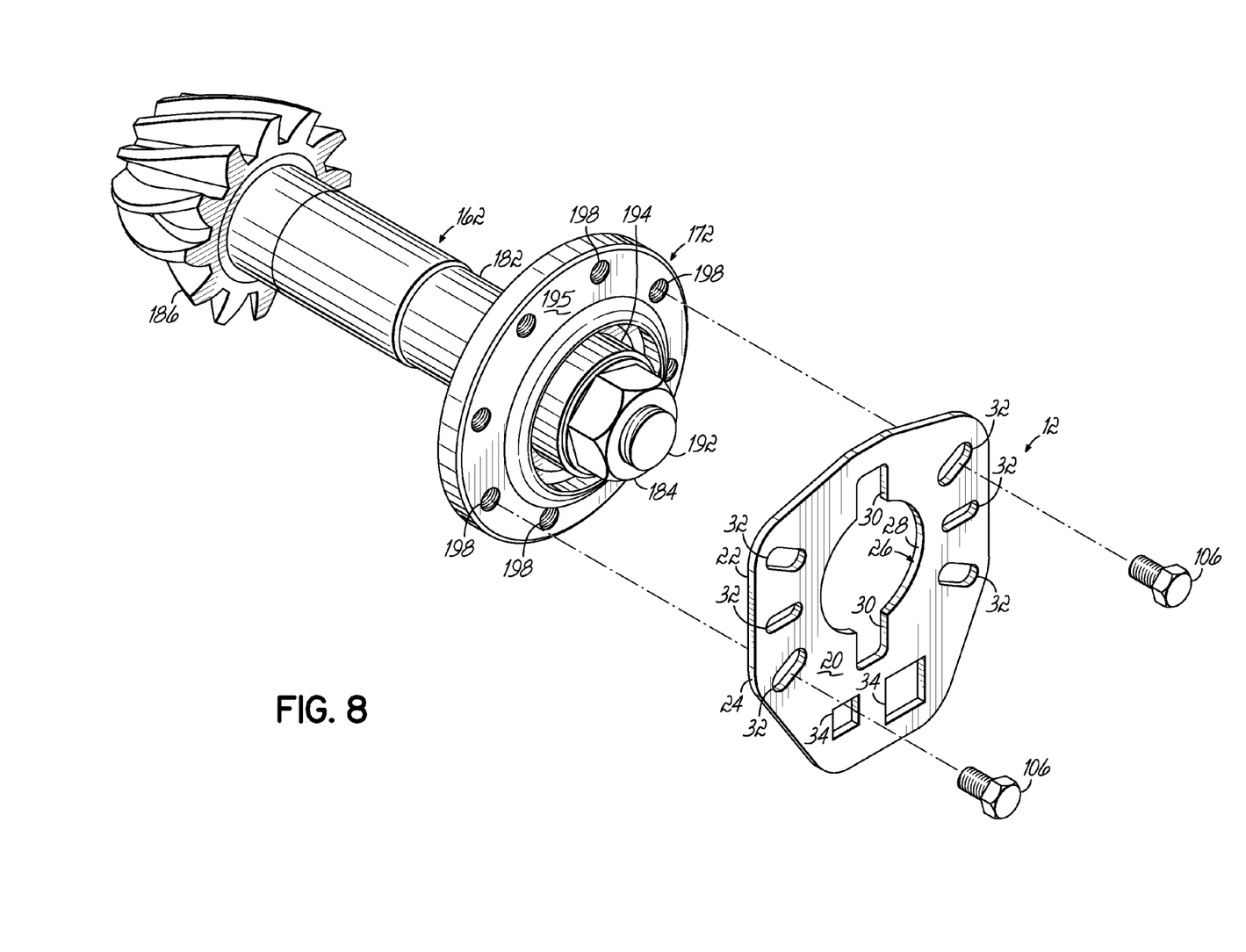
FIG. 8 is a partially exploded view of the pinion disassembly tool of FIG. 1 during placement of the tool onto an alternative pinion assembly including a flange member.

With reference to FIG. 8, an alternative embodiment of the pinion assembly 162 includes a flange member 172 (instead of the yoke 72), a pinion shaft 182, and a pinion fastener 184. The pinion shaft 182 includes a spiral bevel gear 186 at one end which is configured to be coupled to a corresponding gear of the previously-described differential 68. The pinion shaft 182 also includes a splined end (not shown) opposite the spiral bevel gear 186. The splined end includes a plurality of radial splines (not shown) and a threaded rod 192 extending longitudinally beyond the radial splines. The flange member 172 is generally annulus shaped and includes a central portion 194 including an aperture (not shown) configured to receive the splined end 88 of the pinion shaft 82. The flange member 172 also includes a circumferential portion 195 including threaded apertures 198 configured to receive threaded fasteners for producing the joint with the primary drive shaft 70 as described above. The pinion assembly 162 is assembled and disassembled (using the pinion disassembly tool 10) in the same manner as described in detail above.

While the present invention has been illustrated by a description of various embodiments and while these embodiments have been described in some detail, it is not the intention of the Applicant to restrict or in any way limit the scope of the appended claims to such detail. Additional advantages and modifications will readily appear to those skilled in the art. The various features disclosed herein may be used alone or in any combination depending on the needs and preferences of the user. The invention itself should only be defined by the appended claims.

What is claimed is:

1. A pinion disassembly tool configured to remove a yoke or a flange member from a splined pinion shaft in a pinion assembly, the tool comprising:

a yoke holding plate including a central aperture defining a non-circular inner periphery and sized to receive a socket wrench during removal of a pinion fastener from the pinion shaft, a plurality of fastener apertures positioned around the central aperture and configured to receive fasteners coupled to the yoke or the flange member, and at least one non-circular aperture configured to receive a breaker bar during removal of the pinion fastener;

a drive plate defining a non-circular outer periphery and configured to be inserted completely through the central aperture of the yoke holding plate after the removal of the pinion fastener, so as to engage the yoke holding plate after being inserted completely through the central aperture, the drive plate including a threaded aperture; and a drive bolt engaged with the threaded aperture of the drive plate, the drive bolt forcing the drive plate into abutting contact with the yoke holding plate to pull the yoke or the flange member from the splined pinion shaft as the drive bolt is rotated into engagement with the pinion shaft.

2. The pinion disassembly tool of claim 1, wherein the inner periphery defined by the central aperture of the yoke holding plate includes at least one recess, and the outer periphery defined by the drive plate includes at least one projection corresponding in shape to the at least one recess.

3. The pinion disassembly tool of claim 2, wherein the inner periphery defined by the central aperture of the yoke holding plate includes two opposed recesses, and the outer periphery defined by the drive plate includes two opposed tangs.

4. The pinion disassembly tool of claim 3, wherein a central portion of the inner periphery defined by the central aperture of the yoke holding plate defines a generally circular cross-section, and the two opposed recesses define generally rectangular cross-sections extending radially outwardly from the generally circular cross-section.

5. The pinion disassembly tool of claim 3, wherein the two opposed tangs of the drive plate frictionally engage a surface of the yoke holding plate away from the central aperture to prevent relative rotation of the yoke holding plate and the drive plate during pulling of the yoke or the flange member from the splined pinion shaft.

6. The pinion disassembly tool of claim 1, wherein the plurality of fastener apertures includes elongate slot-shaped apertures configured to align with yokes or flange members of various size and shape.

7. The pinion disassembly tool of claim 1, wherein the yoke holding plate includes at least two non-circular apertures having different sizes for different breaker bars.

8. The pinion disassembly tool of claim 1, wherein the yoke holding plate includes a rear surface configured to face toward the yoke or flange member and the drive plate includes a front surface configured to face away from the yoke or flange member, and the front surface of the drive plate abuts and exerts a compressive force on the rear surface of the yoke holding plate when the drive bolt is rotated into engagement with the pinion shaft.

* * * * *